US012493953B2

(12) United States Patent
Petkov et al.

(10) Patent No.: US 12,493,953 B2
(45) Date of Patent: Dec. 9, 2025

(54) DYNAMIC LAYOUT OPTIMIZATION OF ANNOTATION LABELS IN VOLUME RENDERING

(71) Applicant: SIEMENS HEALTHINEERS AG, Forchheim (DE)

(72) Inventors: Kaloian Petkov, Lawrenceville, NJ (US); Rishabh Shah, Wentworth Point (AU)

(73) Assignee: Siemens Healthineers AG, Forchheim (DE)

( * ) Notice: Subject to any disclaimer, the term of this patent is extended or adjusted under 35 U.S.C. 154(b) by 386 days.

(21) Appl. No.: 18/150,834

(22) Filed: Jan. 6, 2023

(65) Prior Publication Data
US 2023/0252629 A1    Aug. 10, 2023

(30) Foreign Application Priority Data
Feb. 10, 2022  (EP) ..................................... 22156156

(51) Int. Cl.
*G06T 7/00* (2017.01)
*G06T 7/50* (2017.01)
(Continued)

(52) U.S. Cl.
CPC .............. *G06T 7/0012* (2013.01); *G06T 7/50* (2017.01); *G06T 11/60* (2013.01); *G06T 15/06* (2013.01); *G06T 15/08* (2013.01); *G06V 20/70* (2022.01); *G16H 30/40* (2018.01); *G06T 2207/30004* (2013.01); *G06V 2201/03* (2022.01)

(58) Field of Classification Search
CPC ......... G06T 7/0012; G06T 7/50; G06T 11/60; G06T 2207/0072; G06T 2207/30004; G06T 15/06; G06T 15/08; G06V 10/764; G06V 10/765; G06V 20/70; G06V 40/00; G06V 40/10; G06V 2201/03; G06V 2201/031;
(Continued)

(56) References Cited

U.S. PATENT DOCUMENTS 8,516,365 B2    8/2013  Hoyer et al.
9,147,221 B2    9/2015  Grasset et al.
(Continued)

FOREIGN PATENT DOCUMENTS

CN    101689177 A    3/2010
CN    104285244 A    1/2015
CN    112652383 A    4/2021

OTHER PUBLICATIONS

The extended European search report and search opinion in EP appl. no. 22156156 dated Nov. 17, 2022.*
(Continued)

*Primary Examiner* — Scott A Rogers

(57) ABSTRACT

A layout of labels for annotating a rendered image is optimized. A rendered image is obtained, and locations of a plurality of regions of interest in the rendered image are determined. Semantic information associated with the plurality of regions of interest is obtained. Based on the semantic information and the locations of the plurality of regions of interest, and, taking into account a visibility of the labels and a further visibility of the regions of interest in the rendered image, the layout of the labels for annotating the plurality of regions of interest in the rendered image is determined.

18 Claims, 9 Drawing Sheets

(51) Int. Cl.
*G06T 11/60* (2006.01)
*G06T 15/06* (2011.01)
*G06T 15/08* (2011.01)
*G06V 20/70* (2022.01)
*G16H 30/40* (2018.01)

(58) Field of Classification Search
CPC .......... G06V 2201/033; A61B 2576/02; A61B 2576/023; G16H 30/40
See application file for complete search history.

(56) References Cited

U.S. PATENT DOCUMENTS

| | | | | |
|---|---|---|---|---|
| 9,437,037 | B2* | 9/2016 | Isokawa | G06T 19/00 |
| 9,495,794 | B2* | 11/2016 | Masumoto | G06T 15/08 |
| 10,893,262 | B2* | 1/2021 | Vetter | H04N 13/232 |
| 11,816,907 | B2* | 11/2023 | Fathi | G06V 20/647 |
| 2019/0096119 | A1* | 3/2019 | Petkov | G06T 15/08 |
| 2021/0279942 | A1 | 9/2021 | Petkov et al. | |

OTHER PUBLICATIONS

J. Christensen, J. Marks and S. Shieber, "Placing Text Labels on Maps and Diagrams," in Graphics Gems IV, 1994, pp. 497-504.

Kroes, Thomas, Frits H. Post, and Charl P. Botha. "Exposure render: An interactive photo-realistic volume rendering framework." PloS one 7.7 (2012): e38586.

S. F. v. Dijk, Genetic Algorithms for Map Labeling, 2001.

T. Ropinski, C. Doring and C. Rezk-Salama, "Interactive volumetric lighting simulating scattering and shadowing," in IEEE Pacific Visualization Symposium (PacificVis), 2010.

Christensen, Jon, Joe Marks, and Stuart Shieber. "An empirical study of algorithms for point-feature label placement." ACM Transactions on Graphics (TOG) 14.3 (1995): 203-232.

Bekos, Michael A., Benjamin Niedermann, and Martin Nollenburg. "External labeling techniques: A taxonomy and survey." Computer Graphics Forum. vol. 38. No. 3. 2019.

Mühler, Konrad, and Bernhard Preim. Automatic textual annotation for surgical planning. Univ.-Bibliothek, Hochschulschr.-und Tauschstelle, 2009: 1-10.

Preim, Bernhard, and Dirk Bartz. Visualization in medicine: theory, algorithms, and applications. Elsevier, 2007: 1-640.

Cmolik Let Al: "Layout-aware optimization for interactive labeling of 3D models", Computers and Graphics, Elsevier, GB, vol. 34, No. 4, Aug. 1, 2010 (Aug. 1, 2010), pp. 378-387.

Thierry Stein et al: "Dynamic label placement for improved interactive exploration", Proceedings of the 6th international symposium on Non-photorealistic animation and rendering , NPAR '08, Jan. 1, 2008 (Jan. 1, 2008), p. 15.

Knut Hartmann et al: "Floating Labels: Applying Dynamic Potential Fields for Label Layout", May 4, 2004 (May 4, 2004), Smart Graphics; [Lecture Notes in Computer Science;;LNCS], Springer-Verlag, Berlin/Heidelberg, pp. 101-113.

Preim Bernhard et al : "Visualization in Medicine: Theory, Algorithms, and Applications" , visualization for medical educatiion, chapter 20, Jun. 21, 2007.

* cited by examiner

DYNAMIC LAYOUT OPTIMIZATION OF ANNOTATION LABELS IN VOLUME RENDERING

RELATED APPLICATION

This application claims the benefit of EP 22156156.6, filed Feb. 10, 2022, which is hereby incorporated by reference in its entirety.

TECHNICAL FIELD

Various examples of the disclosure generally relate to annotation labels in rendered images. Various examples of the disclosure specifically relate to optimizing the layout of annotation labels for displaying semantic context information corresponding to regions of interest in images based on medical volume rendering.

BACKGROUND

Annotation labels can be used to enhance images with textual semantic information, thereby explaining features visible in the images to the viewer. For instance, medical images can be enhanced with information regarding anatomical structures, organs, pathologies, etc., to thereby facilitate review of the medical images by a radiologist. The annotation labels can be superimposed in accordance with an annotation layout onto the image. Sometimes, a sequence of images is to be annotated; the sequence of images can form a movie. In such a scenario, also the temporal dependency of the annotation layout is determined.

Creating globally optimal and temporally coherent annotation layouts for labels in images without manual intervention is a common task in imaging processes. Automatic label placement is an NP-hard problem and optimal solutions often cannot be computed efficiently. Conventionally, genetic algorithms for automated labelling of cartography data are known, where the layout optimization relies on heuristic algorithms inspired by the concept of natural selection in Darwinian evolution. In a simple example, the fitness function to be maximized is defined to track the number of non-overlapped labels, which drives the selection, crossover, and mutation processes on the pool of possible solutions.

However, these algorithms often cannot be computed in real time for use-cases with large images or image animations.

SUMMARY

Accordingly, there is a need for advanced techniques for optimizing the layout of annotation labels in a rendered image. In particular, there is a need for techniques that alleviate or mitigate at least some of the above-identified restrictions and drawbacks.

In the following, the solution is described with regard to the claimed methods as well as with regard to the claimed computing devices, computer programs and storage media, wherein features, advantages, or alternative embodiments can be assigned to the other claimed objects and vice versa. In other words, the claims related to the computing devices, computer programs and storage media can be improved with features described in the context of the methods.

According to various examples, the layout for the labels—i.e., defining the placement of the labels with respect to the image including features that are annotated by the labels is determined using a measure for a visibility of regions of interest and/or the labels in the image, which are associated with the labels.

The labels can include and/or represent the semantic information, e.g., they can include a textual description of semantic information associated with the labeled features/regions of interest. The labels can include a graphical link between the textual description and a respective feature that is labeled; for instance, the label may be anchored at an anchor point that is arranged close to or at the respective feature. A line may be drawn from the anchor point to the label text.

A label may include one or more of a 2D or 3D glyph, a 2D or 3D textbox, a surface, and a connecting line. It is to be understood that any other graphical element or text element may be used as a label.

This is based on the finding that based on a specific label layout, labels may occlude one or more of other labels, one or more of the regions of interest and/or landmarks in the rendered image. The layout for the labels should be optimized using or taking into account such a visibility of at least parts of the image.

A method for optimizing a layout of labels for annotating a plurality of regions of interest and/or landmarks representing regions of interest in at least one rendered image based on an imaging dataset is provided, the method including the following acts.

In an act, the at least one image is obtained.

In general, the image may be an image received from a data storage or another computing device. The image may be loaded from a image repository of a hospital, e.g., a Picture archiving and communication system (PACS). In various examples, the image may be a rendered image, and/or obtaining the at least one rendered image may include rendering the image from a data set, for example an imaging dataset including imaging data such as for example output data of an imaging process, such as a camera or MRI imaging method. The data set may include volumetric or non-volumetric imaging data, in particular medical volumetric imaging data. Accordingly, in various examples, the image may be referred to as a rendered image, based on an imaging dataset.

In another act, based on the image, a plurality of regions of interest and/or landmarks in the image corresponding to the regions of interest may be obtained, locations of the regions of interest and/or landmarks may be obtained. Regions of interest in the image may correspond to parts or regions in the image of particular interest for a user, i.e., image structures such as anatomical structures displaying to the user a specific anatomical structure. Landmarks may correspond to a specific part of the region of interest, which may represent the region of interest and may be used e.g., as an anchor point for the labels with the semantic information. Regions of interest and/or the locations of the regions of interest, as well as landmarks and/or the locations of the landmarks in the at least one rendered image may be obtained. Obtaining may include determining or identifying, using the image, automatically by an algorithm, or manually, or a combination thereof. Obtaining may include receiving by user input or from a database.

Various algorithms are known that facilitate analysis of images, specifically medical images, to detect and locate regions of interest. For instance, certain anatomical regions or organs could be segmented. Bounding boxes for such regions of interest could be determined. Such algorithms can employ machine-learning techniques. The algorithms could be neural network algorithms. Here, training can be facilitated by obtaining a ground truth through supervised learning for multiple training images and then training the neural network algorithm to detect and locate regions of interest in accordance with the ground truth. Since such algorithmic implementations for detecting regions of interest and associated semantic information are, in principle, known to the skilled person, it is not necessary to describe further details in this regard. Further, the specific implementation of such algorithms is not germane for the functioning of the techniques described herein. This is because the techniques described herein relating to the determining of the layout of labels can flexibly function with different types and kinds of algorithms that determine locations of regions of interest and/or are used to obtain semantic information associated with such locations of regions of interest.

In another act, semantic information associated with the plurality of regions of interest and/or landmarks is obtained, wherein obtaining may include receiving from a data storage or other computing device, or determining the semantic information based on the image, e.g., based on the identified regions of interest and/or landmarks.

For instance, a classification algorithm may be used to classify features visible in a certain region of interest. For instance, context information may be obtained from an algorithm used to determine the locations of a plurality of regions of interest. To give an example, a certain algorithm may be trained to detect bone fractures; then, this algorithm may provide, as context information, the type and/or severity of a detected bone fracture as semantic information.

In some examples, it would also be possible that such semantic information is input by the user via a human-machine-interface.

In another act, based on the semantic information and the locations of the plurality of regions of interest and/or landmarks, and taking into account a visibility of the labels and a further visibility of the regions of interest and/or the landmarks in the image, the layout of the labels for annotating the plurality of landmarks in the at least one rendered image is determined. Therein, taking into account a visibility of the labels and a further visibility of the regions of interest and/or the landmarks in the image may include taking into account, if the one or more of the regions of interest and/or landmarks, and/or labels are visible, or occluded by another one of the one or more of the regions of interest and/or landmarks, and/or labels. In other words, the criteria for determining and optimizing the layout of the labels in the image are based on a visibility of these features for the user in the annotated image. In other words, the layout of the labels may be determined and optimized based on a visibility of the labels and/or regions of interest and/or landmarks, i.e., representative parts of the regions of interest. For example, taking into account a visibility may include, taking into account an opacity of the labels, and/or a contrast between one or more labels and/or the image background around the labels (i.e., image parts directly adjacent to the label), and/or an opacity determined for the label.

In other words, the determining of a layout for the labels may be performed based on and/or using measures of a visibility of one or more of a label, and/or a landmark, and/or a region of interest associated with the landmark, e.g., an anatomical structure, in the image. Labels may represent at least part of the semantic information in the image, when the labels are displayed in the image, i.e., together with the image.

Labels may be displayed superimposed onto the image. I.e., the respective textual description of the semantic information may be superimposed onto image pixels. Labels may be displayed with a certain opacity level.

A label may be anchored at a corresponding landmark for annotating a region of interest.

A layout of a label may include one or more of size, location, style, graphical or text content and/or type and number of components of the label, and/or arrangement of the labels in the image in relation to the other labels and/or landmarks.

For instance, a landmark associated with the region of interest could be defined by a center position of the region of interest. A landmark associated with the region of interest could be defined with a certain feature specific to that region of interest. To give a few practical examples, it would be possible that the landmark—to which the label is anchored—is the centroid of a certain anatomical structure. For instance, a landmark could correspond to a certain substructure of an organ, e.g., a top area of the liver, etc.

In various examples, an initial layout may be determined, which may be optimized in a plurality of iterations.

An iterative numerical optimization may be used that seeks to maximize or minimize a target function. A global minimum or maximum may be found by varying parameters within a certain parameter space which may be delimited by one or more constraints.

To give a concrete example, between subsequent iterations it is possible to shift/adjust the label positions of the labels, starting from the label position of the preceding iteration. The direction and/or the step size of such position shift may be defined by the optimization algorithm, that typically takes into account a current value of the target function or the impact of the current label position of the target function. For instance, a gradient descent optimization taking into account the change of the target function as a function of label layout can be used. A genetic optimization could be used. A Landweber optimization may be used.

In general, using or based on the semantic information and the locations of the landmarks and/or regions of interest, the layout of the labels may be optimized. Optimizing may therefore be based on a visibility of the labels, the regions of interest and and/or the landmarks in the image. In other words, the output of each iteration of the optimization process may be an improved layout for the labels in the image, wherein the layout is optimized to improve visibility of the labels and the corresponding landmarks and regions of interest in the image. For example, a measure for the quality of label layout may be determined using a target function and the label layout as an input. An output of an optimization iteration may be an improved layout for the labels, based on an improved target function value as a measure for the visibility of the labels, regions of interest and landmarks when displayed together with the rendered image, as provided by applying the target function to the layout and the image.

In an optional act, the rendered image may be provided or displayed together with the labels to a user, wherein the labels display the semantic annotation information in the image to the user in an improved way, which is more intuitively and easily recognizable by the user.

The determining of the layout of the labels may include determining an initial layout and iteratively optimizing the initial layout based on a target function that is based on the visibility of the labels and the further visibility of the landmarks.

For example, the visibility of a label may be reduced if it is occluded/overlapping with a further label. Alternatively, or additionally, the visibility of a label may be reduced if it is placed in a region of the underlying image having contrast values that have similar contrast as the label text.

For instance, the visibility of a region of interest may be reduced if it is occluded by a label that is placed on top of the region of interest.

For instance, the visibility of a label may be reduced to various positions close to the edges of the images.

The target function may be based on a proximity relationship of at least one of the labels and a corresponding landmark, or of a plurality of labels, relative to each other.

Proximity relationships may, accordingly, specify the relative arrangement between different labels or between a label and landmarks. For instance, the proximity relationship may use a metric that penalizes larger distances between the label text and the anchor point of the label. For instance, the proximity relationship may alternatively or additionally use a metric that penalizes smaller distances between adjacent label texts. For instance, the proximity relationship may alternatively or additionally use a metric that penalizes overlapping label lines connecting anchor points and label texts.

The target function may be based on an occlusion rating associated with the labels; the occlusion rating being based on positions of the labels in the image. An occlusion rating may represent a rate of occlusion associated with one or accumulated over all labels, e.g., an occlusion of another label, a landmark, and/or a region of interest in the image. Larger occlusion ratings may result for larger overlaps. Smaller occlusion ratings may result from higher opacity values used for label text, to give just a few examples.

The target function may be based on depth positions of the plurality of landmarks in the volumetric medical imaging dataset.

Camera depths for certain features in the image, or in other words depth positions, which may be represented by respective depth values identifying the distance from the camera, may be determined by an optical simulation of the volumetric data, e.g., a volume raycasting algorithm, or a raytracing simulation. Depth values for each of a plurality of fragments in an image may be stored as depth map for the image. Therein, a viewing ray from the camera position and through a pixel in the viewport is traced in an optical simulation, and along the viewing ray the optical opacity of the volume data is integrated, i.e., accumulated. Points along the viewing ray are determined, where the accumulated opacity reaches certain thresholds. The camera depth, represented by a depth value, of those positions is the distance from the point to the camera. Therefore, the depth positions may be defined based on accumulated opacity values in an optical simulation based on the volumetric dataset.

The opacity values of an overlay image may be defined based on depth positions determined for multiple positions along rays used for ray-traced rendering of the at least one rendered image. The depth position may be defined with respect to a distance between a camera position used for rendering and the respective region of interest. The depth position may be defined in a reference coordinate system in which the volumetric medical imaging dataset is defined.

The at least one rendered image may include a movie sequence of multiple rendered images, wherein the target function is based on a relative change of the layout between subsequent ones of rendered images of the movie sequence of multiple rendered images. For instance, to avoid sudden changes in the label layout, larger optical flows associated with the label layout may be penalized by means of the target function.

As will be appreciated from the above, various criteria have been disclosed for building the target function. It should be understood that certain other criteria can be considered, e.g., in isolation or in combination with the disclosed criteria above. The disclosed criteria can also be used in various combinations or in isolation.

The target function may be based on multiple criteria, wherein weighting factors associated with the multiple criteria are user-adjustable in-between subsequent iterations of said iteratively optimizing.

Thereby, a closed-loop user interaction when determining the label layout can be implemented. I.e., over the course of the optimization, the target function may be adjusted by the user, based on a current layout of the labels that can be output to the user. Thereby, the user can adjust the optimization criteria according to his/her needs while optimizing, obtaining low-latency feedback.

It is not required to use in all scenarios an iterative optimization for determining the label layout. Other scenarios are conceivable.

Determining of the layout of the labels may be implemented using an artificial neural network algorithm, the artificial neural network algorithm operating based on one or more inputs, the one or more inputs being based on the semantic information, the at least one rendered image, and the locations of the plurality of landmarks.

The layout may be a three-dimensional layout defining positions of the labels in a reference coordinate system to which the volumetric medical imaging dataset is registered, wherein the method may include, based on the layout of the labels and for each one of the at least one rendered image, rendering a respective overlay image depicting the labels.

Each one of the at least one rendered image may be merged with the respective overlay image based on multiple opacity values determined for fragments of the respective overlay image.

This means that opacity values may be determined (not only) for the individual labels, but also for larger fragments of the overlay image, each fragment potentially including multiple labels.

Based on rendering the image from the dataset, a first depth map corresponding to the dataset image may be determined. The rendered image may be rendered using a ray tracing simulation, wherein a plurality of rays originating from a camera the viewpoint are traced based on the imaging data set, wherein at each interaction/event influencing the ray based on the imaging data set, and opacity value of the ray may be updated, such that an accumulated opacity value, including all previous interactions/events, may be calculated. A given fragment in the rendered image may correspond to one or more rays of the ray tracing simulation. When an accumulated opacity value of a ray reaches a first opacity threshold value at an event, a depth value corresponding to the depth of the event may be determined and stored in the first depth map. Accordingly, each first depth value of the first depth map may be associated with a corresponding fragment of the dataset image, wherein the first depth values correspond to a depth, where a ray in an optical simulation, e.g., a volume raycasting algorithm, or raytracing simulation, used for rendering the image associated with the fragment reaches a first accumulated opacity threshold when originating from the camera viewpoint. A depth of a fragment in the annotation overlay image is determined, e.g., based on the location or depth of an intersectional image, i.e., the image plane in the volumetric imaging data, and/or based on one or more landmarks, and/or based on the image or the rendering process of the image, and/or the layout of the labels, wherein the opacity of the fragment in the annotation overlay image may be adjusted based on the depth of the fragment of the annotation overlay image and the first depth map.

A second depth map corresponding to the dataset image may be determined accordingly as the first depth map, including a plurality of depth values corresponding to each fragment of the dataset image, wherein each second depth value of the second depth map is associated with a corresponding fragment of the dataset image, wherein the second depth values correspond to a depth, where the accumulated opacity of the ray in the volume raycasting algorithm used for rendering the image associated with the fragment reaches a second accumulated opacity threshold when originating from the camera view point, wherein the second opacity threshold is higher than the first opacity threshold. The determined depth of the fragment in the annotation overlay image is used and compared to the first and second depth values of the corresponding fragment in the dataset image, and the opacity of the fragment in the annotation overlay image is adjusted based on the depth of the fragment of the annotation overlay image, the first depth value and the second depth value. The first and the second depth map may be generated and used in the same way, i.e., descriptions with regard of the first or second depth map may be applied to the other one of the first or second depth map.

Adjusting the opacity of each annotation fragment in the annotation overlay image may include determining a full opacity of the annotation image fragment, if a depth value of the annotation image fragment is smaller than the first depth value of a dataset image fragment corresponding to the annotation fragment, and/or determining a scaled opacity value, which is a value between a full opacity value (usually 1) and a zero opacity value (usually 0) by comparing the depth value of the annotation fragment to the corresponding first and second depth values, if the depth value of the annotation image fragment is between the first depth value and the second depth value of the rendering image fragment. For example, the scaled opacity value may be determined according to a ratio of the depth of the annotation image fragment to the corresponding first and/or second depth values. Adjusting may further include determining a zero opacity value for the annotation fragment, if a depth value of the annotation fragment is bigger than the second depth value corresponding to the dataset image fragment.

The imaging dataset may be a medical volumetric imaging dataset, and/or the landmarks may be anatomical landmarks.

The layout of the annotation labels may include one or more of a position of a label with regard to the dataset image, a depth of a label with regard to the dataset image, a size of a label, a color of a label, text/content displayed in a label, a distance of a label from a corresponding landmark in the dataset image. It is to be understood that any spatial characteristic of labels, and/or any spatial relation between labels and/or between labels and landmarks may be defined in the layout.

A computing device is provided including at least one processor and memory, the memory including instructions executable by the processor, wherein when executing the instructions in the processor, the computing device is configured to perform the acts of any method or combination of methods according to the present disclosure.

A computer program or a computer-program product and a non-transitory computer-readable storage medium including program code is provided. The program code can be executed by at least one processor. Upon executing the program code, the at least one processor performs any method or combination of methods according to the present disclosure.

It is to be understood that the features mentioned above and those yet to be explained below may be used not only in the respective combinations indicated, but also in other combinations or in isolation without departing from the scope of the disclosure.

DETAILED DESCRIPTION OF EXAMPLES

Figure 1:
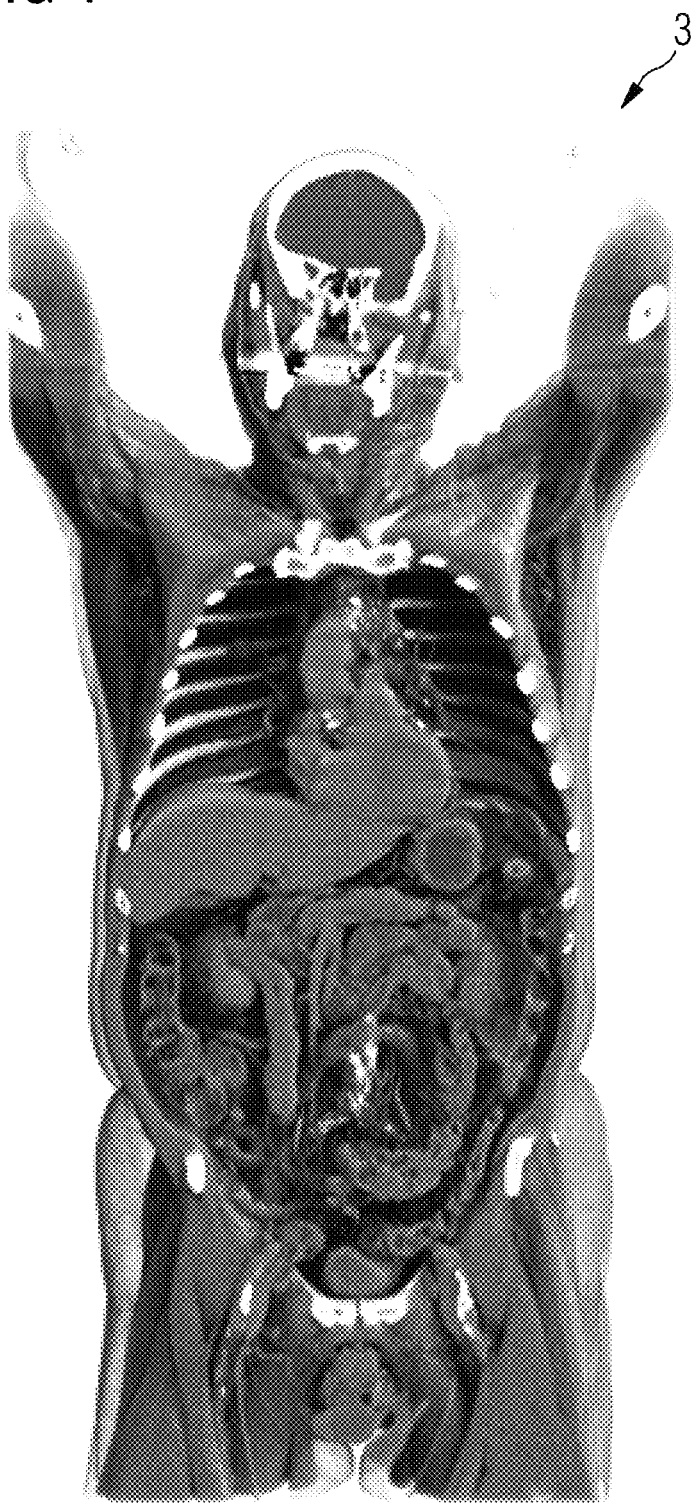
FIG. 1 illustrates a 3D anatomical visualization of patient data using photorealistic volumetric path tracing (Cinematic Rendering), according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a general-purpose processor unit (CPU), a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques will be described that relate to optimized automated placement of labels associated with landmarks identified in an image.

Annotation labels can be used to enhance images with textual semantic information, i.e., display the semantic information to a user in the image together with the other image features, thereby explaining features visible in the images to the viewer. For instance, medical images can be enhanced with information regarding anatomical structures, organs, pathologies, etc., to thereby facilitate review of the medical images by a radiologist. The annotation labels can be superimposed in accordance with an annotation layout onto the image. Sometimes, a sequence of images is to be annotated; the sequence of images can form a movie. In such a scenario, also the temporal dependency of the annotation layout is determined.

Creating globally optimal and temporally coherent annotation layouts in images without manual intervention is a common problem. The disclosed techniques target the display of text labels for body landmarks and organ contours from an AI-based automated segmentation algorithm, for both educational and clinical workflows. The layout uses an iterative optimization based on heuristic rules and simulated annealing running at real-time speeds for the typical data sizes and accounts for the visibility of anatomical structures in 3D volume rendering.

Specifically, an automated layout optimization for annotation labels is performed based on visibility of anatomical structures, temporal coherency heuristics are used to support automated animations and interactive applications, and an improved approximate depth-embedding of opaque geometries on the annotation overlay is provided from dual depth images.

Various examples of the of the methods are applicable in applications that involve rendering of landmarks and segmentation structures, such as Cinematic Anatomy for educational workflows and the Digital Oncology Companion (D.O.C.) extension in AI-Rad Companion for clinical workflows. The techniques are also applicable to virtual reality and augmented reality applications involving 3D rendering and patient anatomical images. Subsets of the technique are further broadly applicable to non-medical and non-volume rendering applications, e.g., CAD/CAM.

Automatic label placement is an NP-hard problem and optimal solutions cannot be computed in reasonable time in the general case. While several algorithms exist that compute labelling layouts with desirable properties, the focus herein is specifically on fast local optimization algorithms that can perform in real-time for the typical problem sizes in single-case medical visualization.

Conventionally, genetic algorithms for automated labelling of cartography data are known, where the layout optimization relies on heuristic algorithms inspired by the concept of natural selection in Darwinian evolution. In a simple example, the fitness function to be maximized is defined to track the number of non-overlapped labels, which drives the selection, crossover, and mutation processes on the pool of possible solutions. Simulated annealing is a variation of local optimization, where optimization steps leading to worse results on an objective cost function may be kept with a probability proportional to the change in the cost function. The technique approximates the global optimum of the solution by forcing larger random changes in the beginning of the iterative optimization process with the goal of avoiding local maxima. The techniques according to the disclosure contribute rules and heuristics related to layout optimization based on visible anatomical features in 3D medical volume rendering, in both traditional 2D and immersive 3D visual environments.

Conventional volume visualization methods based on ray casting, which may also be referred to as ray tracing simulations, which are still used in many current advanced visualization medical products, simulate only the emission and absorption of radiant energy along the primary viewing rays through the volume data. The emitted radiant energy at each point is absorbed according to the Beer-Lambert law along the ray to the observer location with absorption coefficients derived from the patient data. Renderers typically compute shading using only the standard local shading models at each point along the ray (e.g., the Blinn-Phong model), based on the local volume gradients (local illumination). While fast, these methods do not simulate the complex light scattering and extinction associated with photorealism (global illumination).

Cinematic Rendering, another ray tracing simulation, implements a physically-based Monte Carlo light transport, which simulates light paths though the volume data with multiple scattering events per path using a stochastic process. As more and more paths are simulated, the solution converges on an accurate estimation of the irradiance at each point for incoming light from all directions. The renderer employs a hybrid of volumetric scattering and surface-like scattering, modeled by phase functions and BRDFs respectively, based on properties derived from the anatomical data, as described for example in Kroes, Thomas, Frits H. Post, and Charl P. Botha. "Exposure render: An interactive photorealistic volume rendering framework." PloS one 7.7 (2012): e38586. The medical data is illuminated using image-based lighting by high dynamic range light probes, which can be acquired photographically with 360-degree cameras to resemble the lighting condition of real-world venues. Such lighting leads to a more natural appearance of the data when compared to images created using the synthetic light sources that are typically applied in direct volume rendering methods. When also combined with the accurate simulation of photon scattering and absorption, the renderer produces photorealistic images that contain many shading effects observed in nature, such as soft shadows, ambient occlusions, volumetric scattering and subsurface photon interactions.

FIG. 1 illustrates a 3D anatomical visualization of patient data using photorealistic volumetric path tracing (Cinematic Rendering), according to various examples.

As can be seen in FIG. 1, an illustration of 3D anatomical visualization of patient data with photorealistic volumetric path tracing (Cinematic Rendering) is shown as a 3D image without labels. Here, a plane is selected to display a cross-sectional image based on the medical volumetric dataset, wherein regions with low opacity are shown transparent, i.e., the chest is displayed as partly hollow. Therein, the lungs are displayed as an empty space as a result of the voxel optical opacity being defined by the voxel classification.

Figure 2:
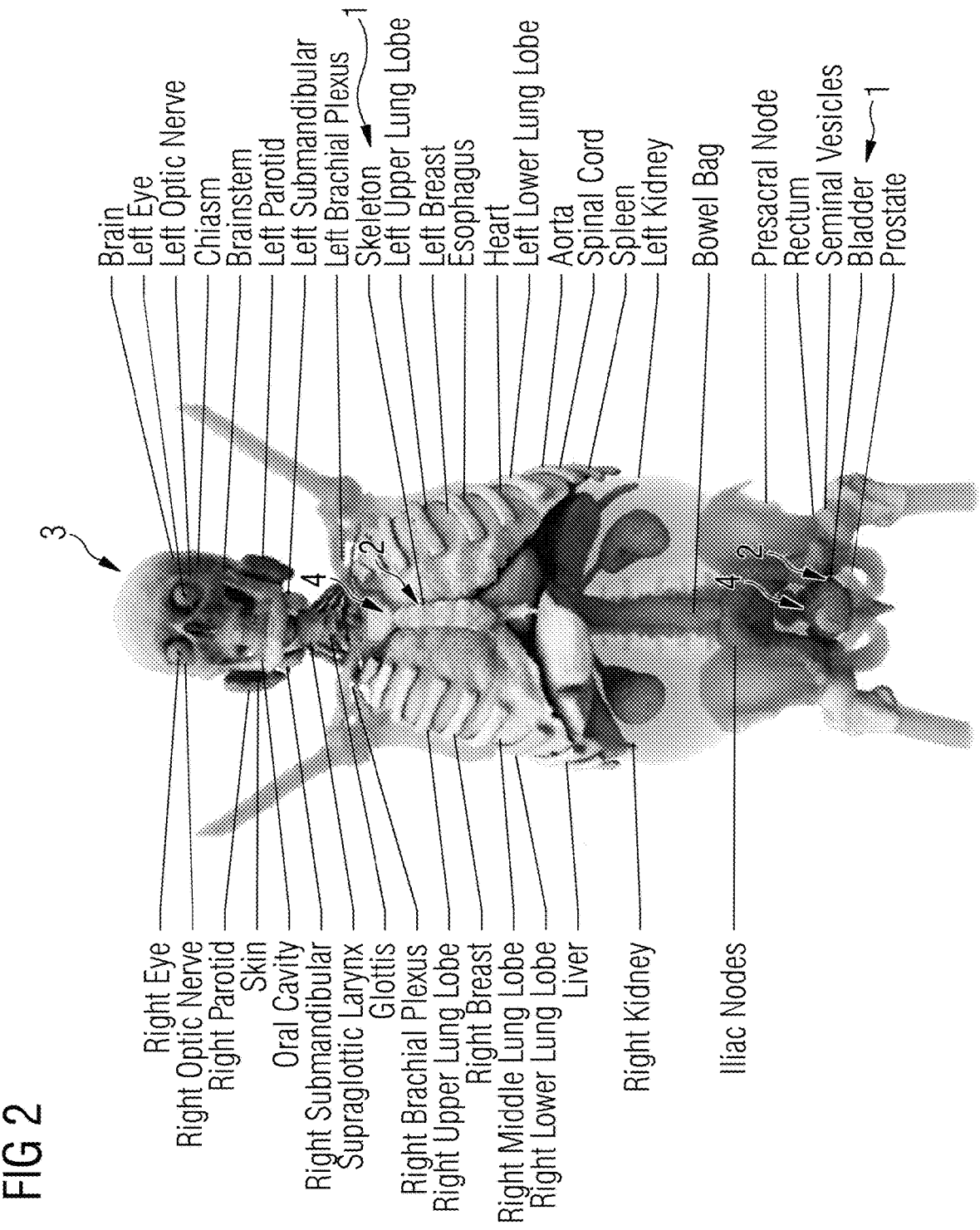
FIG. 2 illustrates an annotation overlay being applied to a photorealistic renderer of 3D medical images, according to various examples.

FIG. 2 illustrates the annotation overlay displaying a plurality of labels 1 being applied to a photorealistic renderer of 3D medical images 3 based on Monte Carlo volumetric path tracing, according to various examples.

As can be seen in FIG. 2, the segmented organ rendering image 3 visualizes the mask voxels associated with a plurality of determined regions of interest 4 (i.e., organs) together with associated landmarks 2 directly and showcases the depth embedding of the overlay image including the labels 1, i.e., landmark glyphs, connecting lines and textboxes, against the purely volumetric rendered image 3. The labels 2 of the segmented organs are displayed based on the automated label generation, layout optimization and overlay rendering according to the present disclosure.

Here, the visibility of the organs and corresponding landmarks together with lines and text boxes have been taken into account according to the criteria as described above. Specifically, a proximity relation, which may be a part of the target function, and which may define a spatial relationship (e.g., distance between two elements, or overlap of two elements) between the different labels and the corresponding organs and/or landmarks (i.e., specific representative parts of the organs in the image) has been optimized, wherein the labels are arranged such that they do not overlap each other and organs, wherein the distances between the labels and the regions of interest is regular, within a predetermined threshold from an average distance. In this example, an occlusion rating, which may be a part of the target function, and which may describe an overlap or occlusion of the labels and/or the regions of interest and/or landmarks, has been minimized.

The techniques according to the present disclosure improve accuracy of a depth embedding for highly opaque surfaces by generating a first depth map and a second depth map based on first and second accumulated opacity thresholds and simulating a volumetric extinction under the assumption of a homogeneous participating media. While approximate, this method allows the rendering of the annotations overlay to be decoupled from the volume rendering algorithm. The generation of the second depth map may be performed by a separate volume raycasting, independently from the first depth map, even in path tracing systems, as the Monte Carlo solver may converge on the correct distance range along the primary viewing very slowly for large optically transparent areas of the volume data. The techniques in the paper are broadly applicable to a range of rendering algorithms, including systems that produce only a single depth layer from the volume data, or employ alternative methods for embedding surfaces in the volume data (e.g., based on depth peeling).

In the following, the steps for optimizing the layout of labels for displaying semantic annotations associated with a plurality of landmarks in a rendered image will be described with regard to the disclosed examples in medical volume rendering, however it is to be understood that the presented techniques may be applied to any image rendering process in general with adaptions as may be needed.

In an act, an image is obtained. In various examples, a 3D volumetric medical image or a frame from a 4D medical image is received or rendered from a volumetric dataset.

In another act, based on the image, an automated annotation and organ contouring in the image may be performed. In various examples, landmarks may be detected in the image, for example kidney top or bottom or center, rib tip T12 and similar landmarks.

Organ landmarks may be generated from contouring data, e.g., center of mass of organ voxels and/or organ mesh contour. Alternatively, the annotation and organ contouring may be performed manually.

In various examples, the image may be obtained independently from the annotation labels and/or independently from the layout of the annotation labels. In other words, two separate images may be obtained and/or determined, wherein one image is the rendered image based on the imaging dataset, and the other image may be an overlay image, containing the annotation labels according to the label layout, and which is to be overlaid over the rendered image in order to display the labels in the image. Accordingly, the rendered image may include a plurality of rendering fragments at associated positions, and the overlay image may include a plurality of overlay fragments at associated positions, wherein the pixel positions of a rendered fragment and an overlay fragment are the same, such that they may be combined by overlaying the overlay fragment onto the rendered fragment, optionally with adjusting of an opacity value of the overlay fragment, e.g., based on the properties of the rendered fragment (e.g., color, opacity, depth). The result may be referred to as a resulting image, including features of the rendered image and the overlay image.

In another act, an annotation layout may be selected for labels to be displayed in the image, which may represent and display semantic annotation information associated with the landmarks. Annotation labels may consist of a 3D glyph at the 3D landmark location, a 2D or 3D textbox, and a connecting element. In various examples, a label layout may be in main 3D space, e.g., for AR/VR applications, i.e., a label may be associated with a plurality of different depth values. Labels may be in a 2D layout on the focal plane with 3D landmark and connecting element visualizations, i.e., a label may be associated with a common depth value from a camera viewpoint. In various embodiments, a label, a plurality of labels, or all labels may lie in a plane, i.e., have a common depth from a camera viewpoint. It is also possible that a group or several groups of labels may lie in different common planes. Alternatively, the convergence plane may be used for stereoscopic display applications.

In an act, during volume rendering, post-classification volume data statistics per viewing ray in a raycasting pass may be determined. In various examples, a representative depth D1 may be generated, using a predefined first opacity threshold, e.g., a 0.35 accumulated opacity threshold. If the threshold is not reached, the center of the depth range containing non-zero optical opacities may be used instead.

A full opacity saturation depth D2 may be generated using a second predefined opacity threshold, e.g., 0.999 accumulated opacity. If the ray leaves the volume data bounds before accumulated opacity reaches the threshold, a depth value may be extrapolated based on the accumulated opacity at the exit point and the distance to the first non-transparent sample, assuming a homogeneous participating media. Photorealistic rendering based on Monte Carlo volumetric path tracing may require a separate raycasting pass to collect the ray data.

In another act, an initial placement of labels may be performed, wherein an initial position is determined for the labels in the rendered image.

In various examples, occlusion factors may be determined for each annotation based on the 3D position of landmarks. An occlusion factor may for example be an occlusion rating, representing how much of the label/region of interest is occluded by another label. Initial placement may be based on rules, e.g., landmarks may always be visible. Alternatively, an occlusion factor may be determined by the depth, i.e., the camera-space depth, of the 3D landmark, D1 and D2. In various examples, annotations may fade in for 5 mm in front of D1 and for 5 mm behind D2. As a result, labels and landmarks fade in and out as clipping planes move through the data or as dynamic landmarks move away from visible structures. An occlusion factor may be determined by distance to the viewport, e.g., landmarks fade away near the edges of the screen; alternatively, the landmark fades away over a short distance away from the viewport box so that connecting lines and labels remain partially visible as the landmark moves out of the screen, e.g., during camera panning.

The position of a 3D landmark may be computed in the viewport of the camera.

An initial plane in 3D space for the annotation label rendering may be selected. A view-aligned annotation plane may be selected, depth selected to minimize distances to landmarks. Alternatively, Principal Component Analysis (PCA) may be performed on the 3D landmark positions, wherein a plane defined by primary and secondary axis may be used as the layout plane. Accordingly, the initial layout may include a depth of a plane, in which the labels are to be displayed, in this case the initial layout defines a common depth value for the plane and the labels.

An initial label arrangement, including positions of the labels, may be computed based on different constraints. In various examples, labels may be split into groups, e.g., left/right, or into screen quadrants. Alternatively, no constraint may be used, and the initial position of the textbox may be the landmark position in viewport space. A fast greedy algorithm or simple heuristic rules may be used, e.g., placing each successive text box in the first available non-overlapping space.

In another act, an iterative optimization of label placement for 2D or 3D layouts may be performed. Optimization may target different final layouts, e.g., clustered or circular layouts.

According to the present disclosure, optimizing the label layout may be performed using a number of steps, based on a visibility of the labels and landmarks in the image.

In other words, input for an optimization algorithm may be the labels, a layout of the labels, and the image including landmarks. The layout of the labels may be modified using one or more heuristic rules. The heuristic rules may be based on a visibility of the labels and/or landmarks in the resulting image, when the rendered image and the overlay image are displayed together. The modified layout may be evaluated using a target function, the target function being applied to the labels in the provided layout in the image, wherein the target function provides a target function output value based on a visibility of the labels and/or landmarks, wherein the target function evaluates the layout based on the plurality of criteria. The target function and/or the criteria may be based on a visibility of the images and/or the landmarks and/or image structures of interest in the resulting image. The modified layout may be provided as an output of the optimization algorithm.

A layout may be evaluated and optimized using a target function based on a plurality of criteria, which may be based on or take into account a visibility of labels and/or landmarks. It is to be understood that the presented criteria are mere examples and many other criteria, e.g., based on a visibility of labels and/or landmarks, may be used and combined in the target function.

In various examples, during optimization, for each label, one or more of the following heuristic rules (i.e., instructions for rearranging labels) may be applied to change the layout. It is to be understood that the presented heuristic rules are mere examples and many other rules, e.g., based on a visibility of labels and/or landmarks, may be used.

| Heuristic rules for changing a layout | Criteria to be taken into account in the target function |
|---|---|
| Neighboring labels may be pushed away to minimize textbox overlap | Overlap of label with another label, e.g., percentage of visibility of a label, as an example of a proximity relationship |
| Labels may be pushed away from important anatomical structures in camera-space. For example, based on organ segmentation, it may be avoided to place text boxes on top of organ representation in the camera viewport. For 3D layouts, the projection of the text box on the camera viewport may be used. | Overlap of label with a landmark, e.g., percentage of visibility of a landmark, as an example of a proximity relationship |
| Based on dual depth images, for example labels may be pushed toward an area of the screen where the distances between D1 and D2 is higher than a predefined threshold distance, which likely indicates homogeneous regions of low opacity. | Placement of labels in regions with low and/or homogenous opacity, e.g., an average opacity value in the region of the image where the label is placed, and/or a measure how much the opacity of changes in the region, as an example of a proximity relationship |
| Based on explicit camera masks, for example detected user's hands or surgical instruments in augmented reality applications, labels may be moved out or into such masked areas. | Overlap of regions of high interest for a user in the image |
| A label may be swapped with a neighboring label to minimize the number of connecting line intersections in camera-space between the textbox anchor points and the corresponding 3D landmark positions. | Number of connecting line intersections, as an example of a proximity relationship |

| Heuristic rules for changing a layout | Criteria to be taken into account in the target function |
|---|---|
| A label may be swapped to, i.e., rearranged in a different group in order to minimize overlap with visible anatomical structures. | Overlap of label with a landmark, e.g., percentage of visibility of a landmark |
| A label may be swapped to, i.e., rearranged in a different group in order to minimize the length of landmark to textbox lines. | Length of connecting lines |

When applying the heuristic rules, an action selection at each iteration may be guided by user- and application-specified weights for each criterion.

The target function may define an objective metric for the layout quality, and a gradient descent or other numerical optimization methods may be applied to optimize the layout. The quality metric may be based on user ratings. Machine learning approaches may be used.

The optimization process may be performed by a genetic algorithm. Simulated annealing may be used to avoid the optimization converging globally sub-optimal but locally optimal solutions.

Some embodiments may move the focal plane for the 2D label layout to minimize the overlapping of connecting lines.

From a dataset, a plurality of images may be rendered, for example corresponding to different planes, which may be displayed in an animation, or the user may interactively change to different planes/images, when viewing the dataset. Temporal constraints may be applied on label movements to ensure temporal coherency during such animations and/or during interactive rendering in AR/VR applications with head tracking.

Embodiments of the system may instead perform independent optimizations for each animation keyframe and explicitly interpolate the layout parameters.

Using the layout quality metric, the optimization phase may compute intermediate transition layouts that maximize the minimal layout quality during an animation.

In another act, an annotation rendering pass may be performed.

In various examples, annotation rendering may be performed to a separate overlay image, which can be displayed and depth-merged independently from the volume rendering process, in some examples using depth images D1 and D2.

When using D1 and D2, for every fragment in the overlay rendering, the normalized distance in the [D1, D2] range may be computed. The fragment opacity may then be scaled based on the normalized distance assuming an extinction from a homogeneous participating media with opacity scaling of 1.0 at distance D1 and 0.0 at distance D2.

In the following example implementations of the disclosed techniques will be explained. Body landmark detection and organ contouring are performed in a pre-processing act. Further, smooth surface meshes are generated for the detected organs, together with labels for each organ, anchored at the organ voxel closest to the center of gravity. In these examples, an image is rendered from a volumetric dataset, wherein the semantic information includes names of specific parts of organs of the human body.

Figure 3:
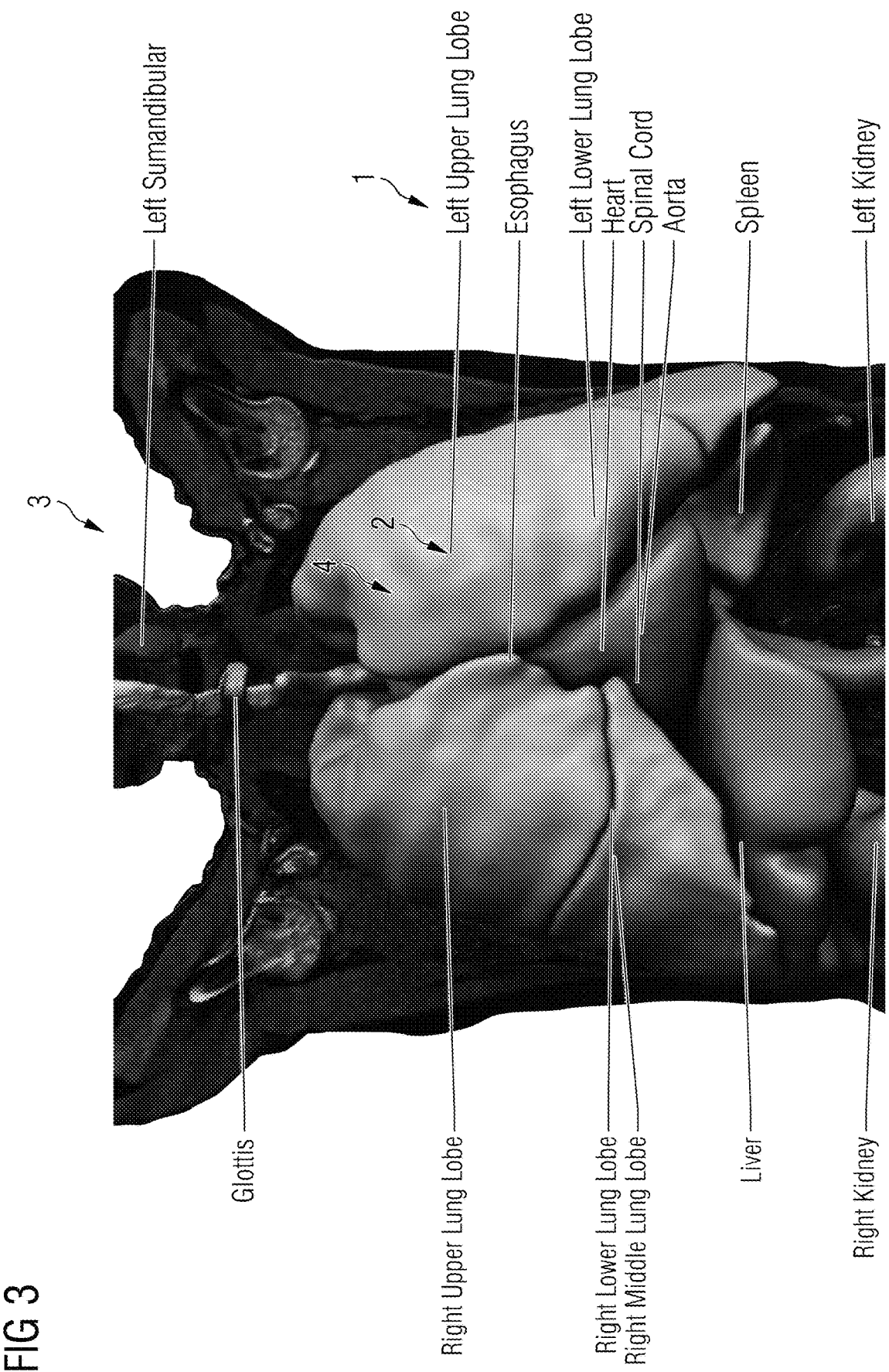
FIGS. 3-5 illustrate frames from a panning animation, where annotation labels fade away as the corresponding 3D positions leave the confines of the rendering viewport, according to various examples.
Figure 4:
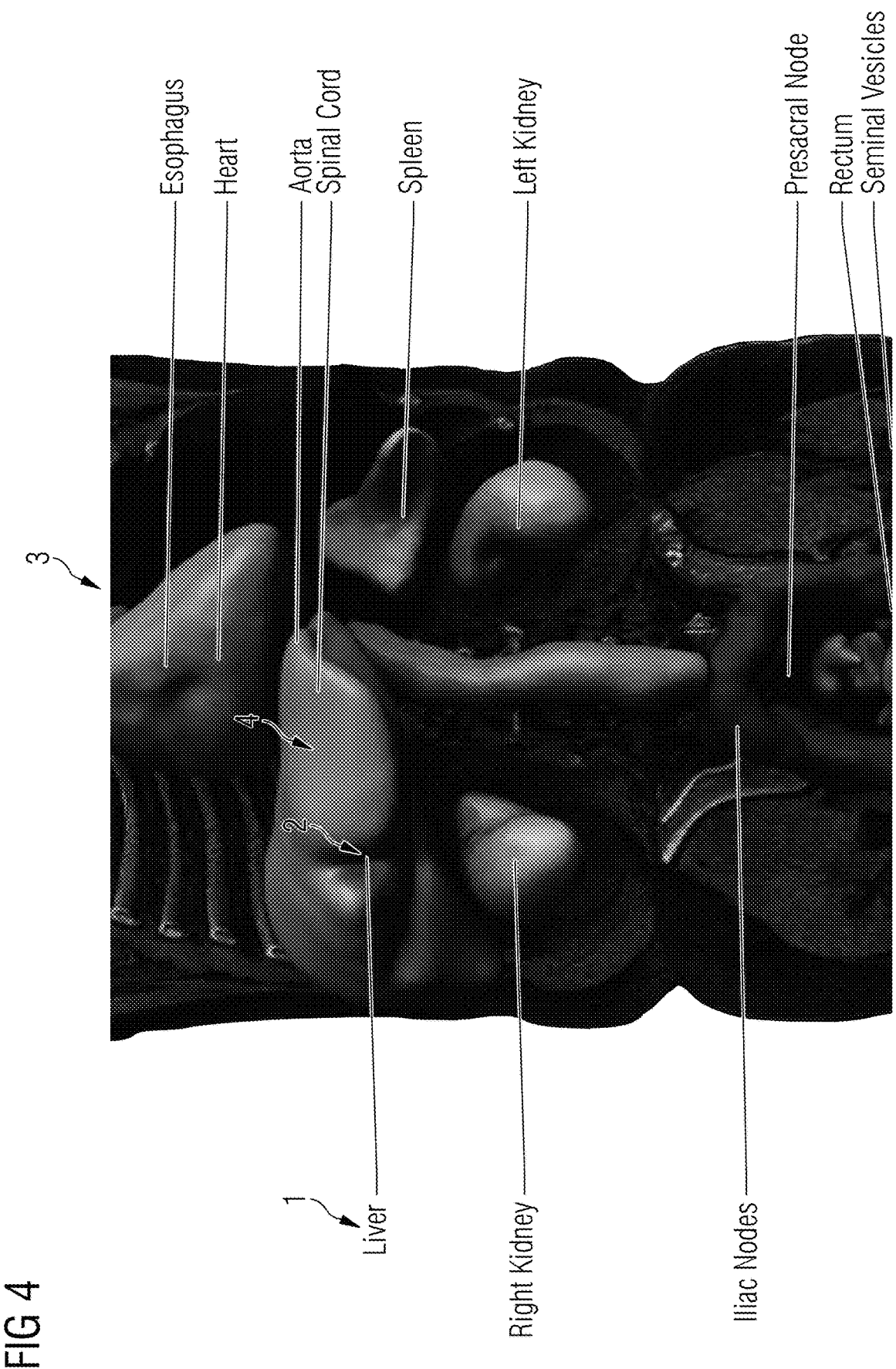
Figure 5:
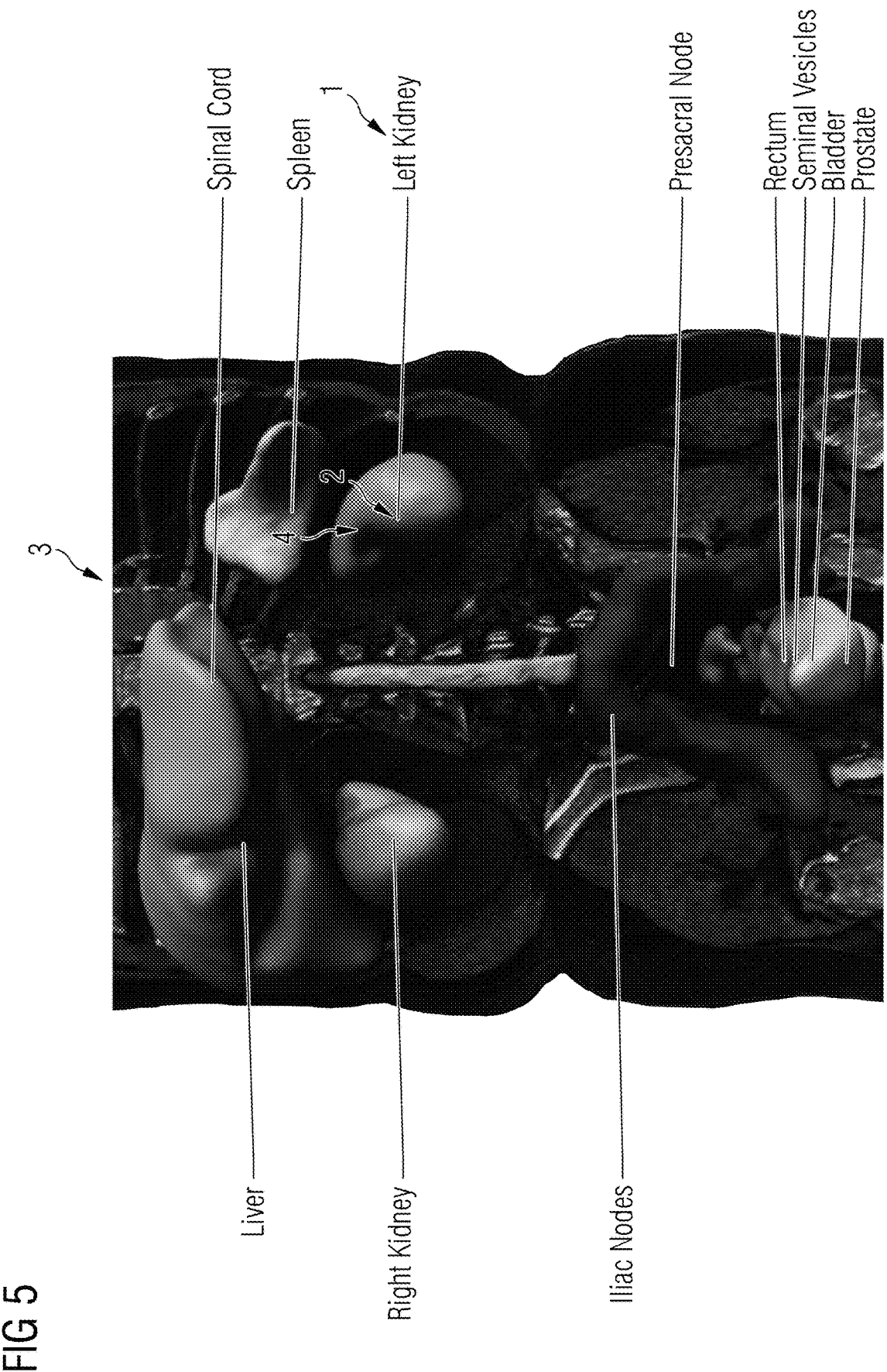

FIGS. 3-5 illustrate frames from a panning animation, wherein labels 1, i.e., landmark glyphs, their textboxes and connecting lines, are displayed in a corresponding image plane referring to a plurality of regions of interest 4 and corresponding landmarks 2, which fade away as the corresponding 3D locations leave the confines of the rendering viewport, according to various examples. In FIGS. 3-5, a plurality of images, i.e., frames, are shown from a panning animation (Head to Feet), showing the visibility handling of organ labels 1 based on viewport containment. As the camera moves, the camera viewport moves (the viewport is the virtual representation of the display in the 3D scene). As landmarks enter and leave the visible viewport, the landmark opacity is changed and landmarks with zero opacity aren't included in the layout optimization. This results in less cluttered visualization as new landmarks 2 come into view or organ meshes and their labels 1 fade in during the animation. For example, a region of interest may be associated with a plurality of landmarks referring to different parts of the region of interest e.g., to the top/center/lower end of an organ.

Accordingly, a movie sequence of multiple rendered images may be provided, wherein the target function is based on a relative change of the layout between subsequent ones of rendered images of the movie sequence of multiple rendered images. Here, the layout of the labels may be dynamically adjusted based on the user input, wherein the target function is based on multiple criteria, and wherein weighting factors associated with the multiple criteria are user-adjustable in-between subsequent iterations of said iteratively optimizing. When determining the label layout for each image in the movie sequence, a temporal coherency criteria may be determined and included in the target function, describing a temporal coherency of e.g., the positions of the layout, such that changes in the layout above a predetermined threshold over a predetermined period of time and/or number of frames may be penalized in the target function.

Figure 6:
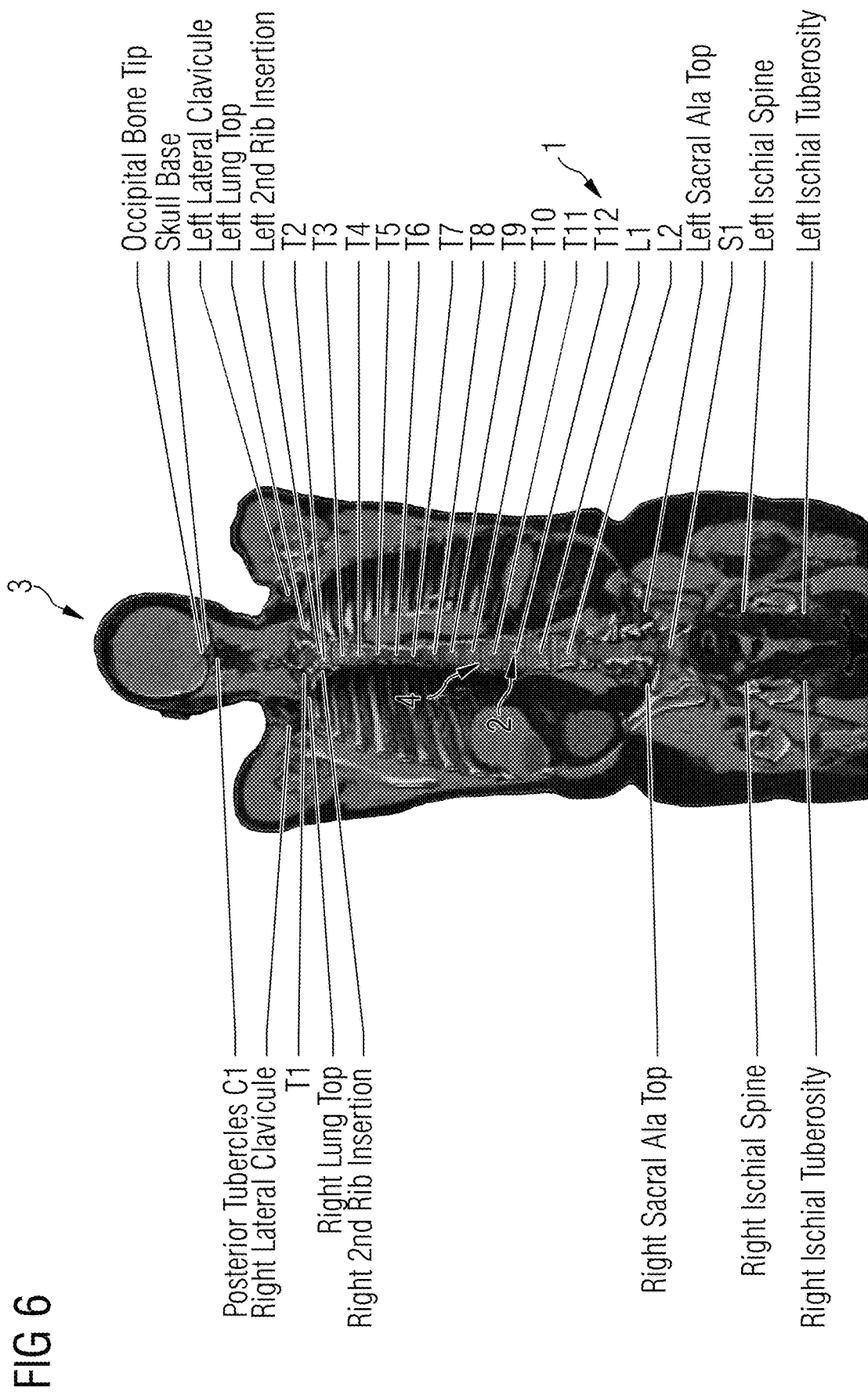
FIGS. 6-8 illustrate the effects of landmark labels fading in and out based on their distance to visible anatomical structures, according to various examples.
Figure 7:
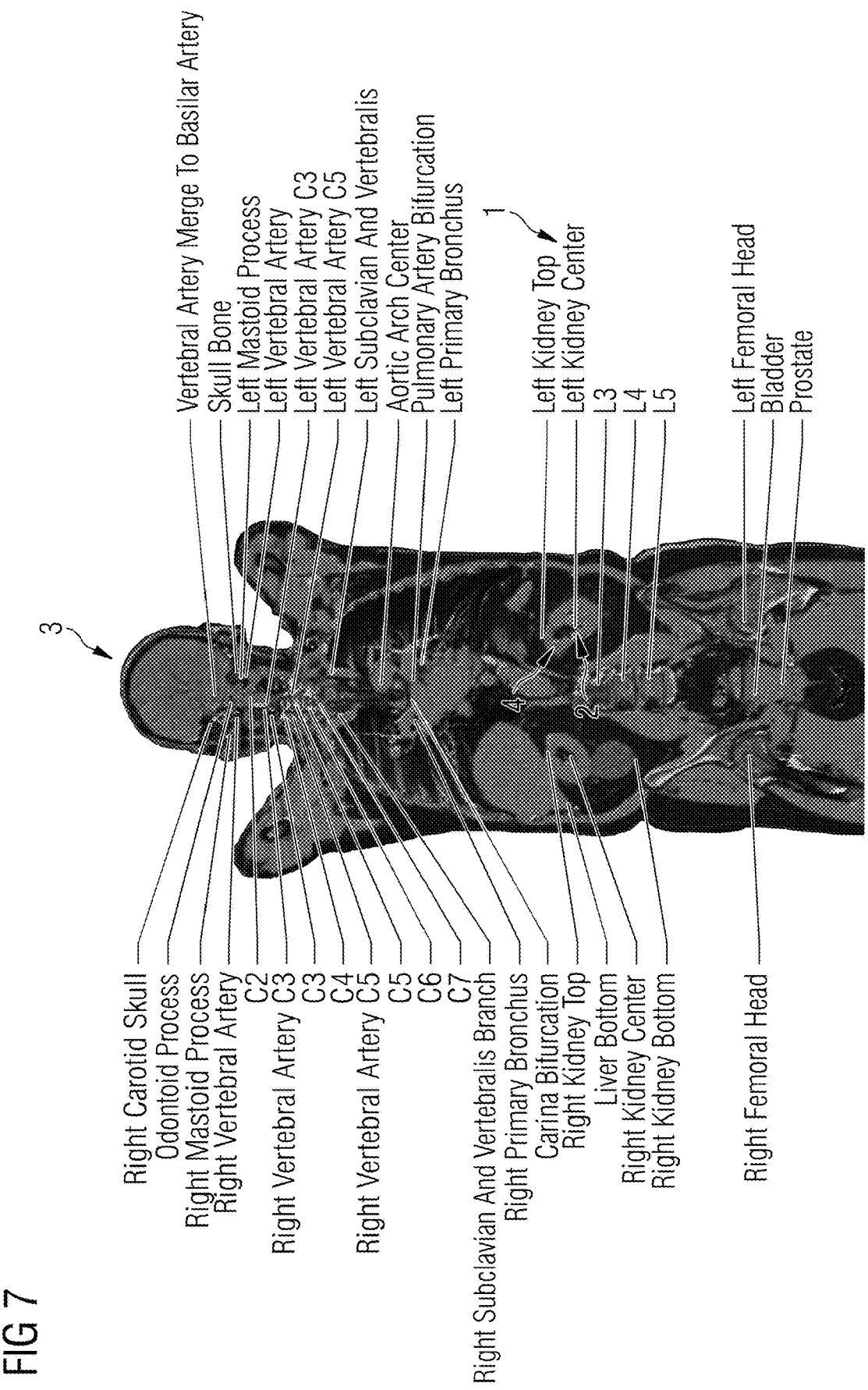
Figure 8:
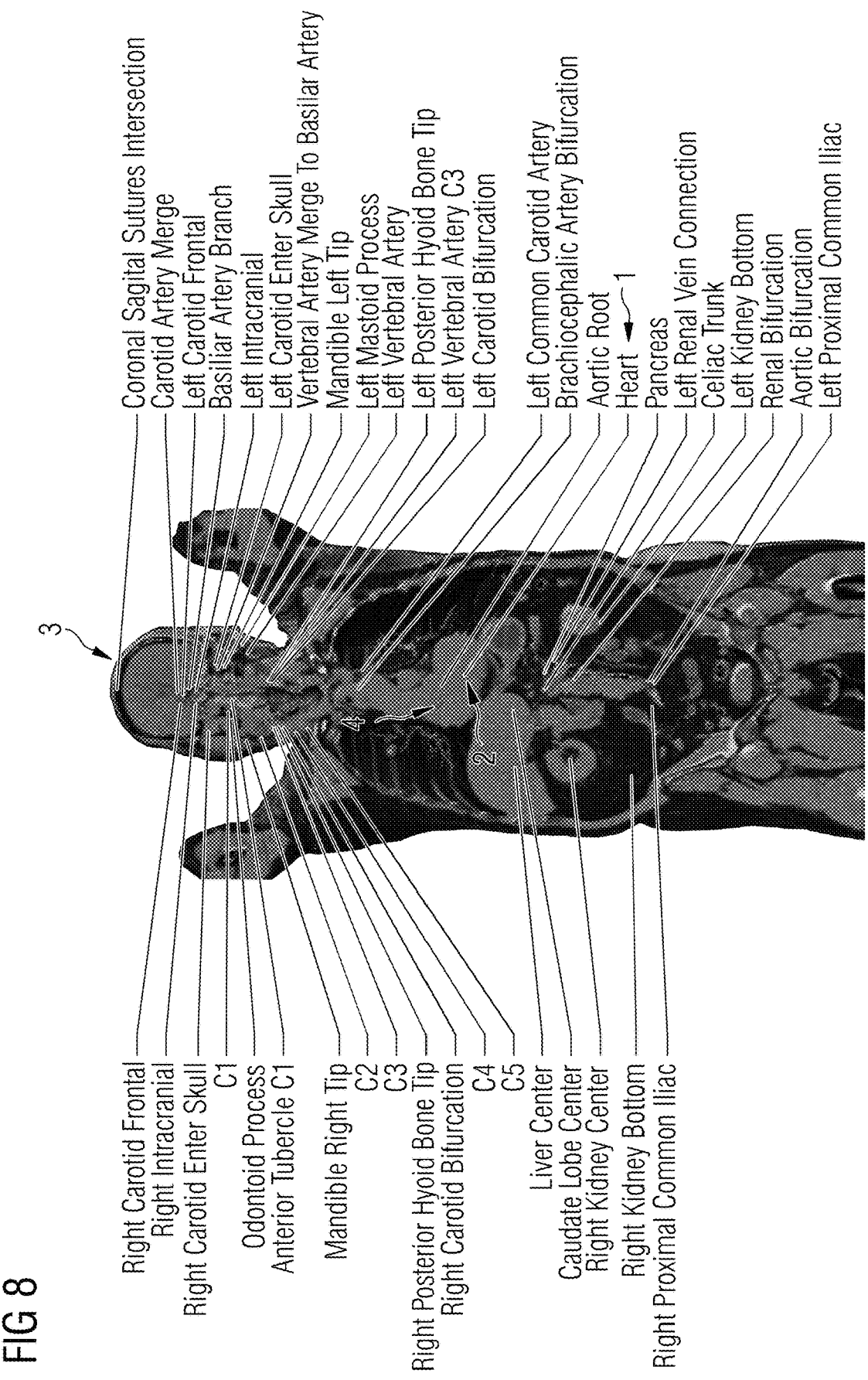

FIGS. 6-8 further illustrates the effects of landmarks 2 fading in and out based on their distance to visible anatomical structures 4 and their landmarks 2, according to various examples. In FIGS. 6-8, images 3, i.e., frames, are displayed from a clip-through animation (Posterior to Anterior) showing the visibility handling of landmark labels 1 based on distances to visible anatomical structures. The video contains a single clip plane aligned to the anterior patient orientation and moving from the back of the body toward the front. The landmark 2 fade distance in 10 mm. The same rule set is applied to the layout optimization for both FIGS. 2 to 5, but other implementations may introduce heuristic rules to indicate for example out of view landmarks 2 or apply only a subset of the heuristic rules.

In the described examples, the layout is a three-dimensional layout defining positions of the labels in a reference coordinate system to which the volumetric medical imaging dataset is registered, wherein the method further includes, based on the layout of the labels and for each one of the at least one rendered image, rendering a respective overlay image depicting the labels, wherein the rendered image is merged with the respective overlay image based on multiple opacity values determined for fragments of the respective overlay image.

The determining of the layout of the labels in the described examples may be implemented using an artificial neural network algorithm, the artificial neural network algorithm operating based on one or more inputs, the one or more inputs being based on the semantic information, the at least one rendered image, and the locations of the plurality of regions of interest.

Generally, taking a visibility of the labels and regions of interest into account may include determining an overlap and/or a proximity of a label or part of a label to a corresponding landmark or region of interest. Taking into account the visibility may include applying a target function to the layout, wherein the target function determines a measure of the visibility of one or more of the labels, any part of the labels, the regions of interest, and the landmarks, wherein a measure may include one or more or an occlusion rating (e.g., an overlap percentage) for each of the labels and/or regions or interest or landmarks, or a proximity relation between each of the labels and/or regions or interest or landmarks.

Figure 9:
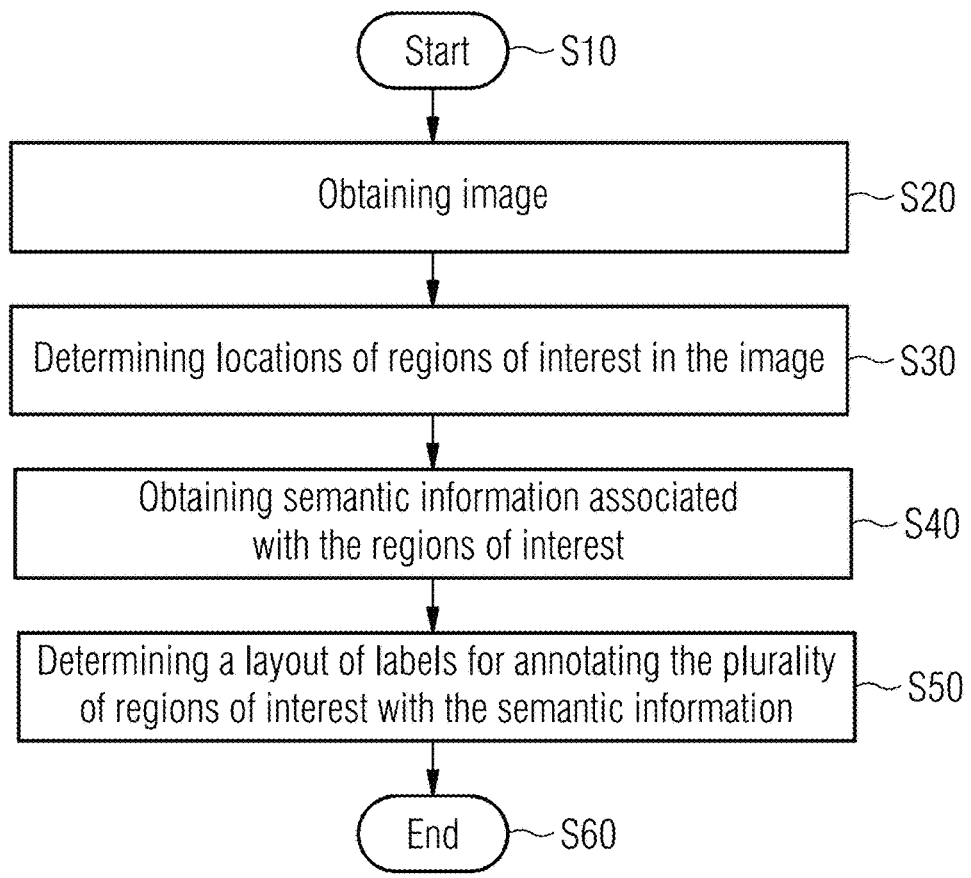
FIG. 9 schematically illustrates acts of a method for optimizing the layout of labels in a rendered image, according to various examples.

FIG. 9 schematically illustrates acts of a method for optimizing the layout of labels in a rendered image, according to various examples.

The method starts in act S10. In act S20, at least one rendered image is obtained. In act S30, locations of the plurality of regions of interest in the at least one rendered image are determined. In act S40, semantic information associated with the plurality of regions of interest is obtained. In act S50, based on the semantic information and the locations of the plurality of regions of interest, and taking into account a visibility of the labels and a further visibility of the regions of interest, the layout of the labels for annotating the plurality of regions of interest in the at least one rendered image is determined. The method ends in act S60.

Figure 10:
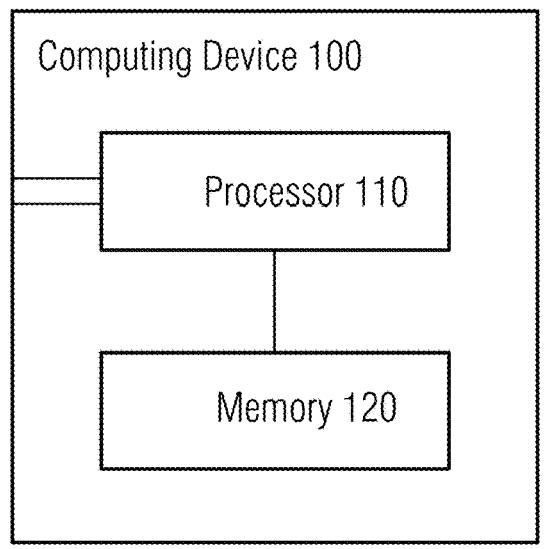
FIG. 10 schematically illustrates a computing device configured for performing a method according to the present disclosure, according to various examples.

FIG. 10 schematically illustrates a computing device configured for performing any method according to the present disclosure, according to various examples The computing device 100 includes at least one processor 110 and memory 120, the memory 120 including instructions executable by the processor 110, wherein when executing the instructions in the processor 110, the computing device 100 is configured to perform the acts according to any method or combinations of methods according to the present disclosure.

An improved method for optimizing the layout of labels for displaying annotation information in an image is described, wherein the image is rendered independently from the labels, and the labels are displayed together with the image using an overlay image containing the labels, in a merged resulting image. Opacity of the overlay image may be adjusted. An optimization process for the layout of the labels, including particularly locations of the labels in the overlay/resulting image, is performed based on a plurality of heuristic rules, which describe, how the layout may be modified, and a target function, which evaluates a metric for the layout, based on a visibility of the labels and the landmarks in the resulting image. In various examples, an opacity of the overlay image may be adjusted by using a first and a second depth maps for the rendered image, which may be determined based on a raytracing simulation, e.g., a volume raycasting algorithm, for the rendered image, during rendering or in separate raytracing simulations. Therein, a depth image may be computed as part of the volume raycasting algorithm by recording the positions along the viewing rays where the accumulated optical opacity reaches certain thresholds.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various scenarios have been disclosed in connection with a rendered image of a volumetric medical imaging data set. Similar techniques may be readily applied to other kinds and types of rendered images, e.g., rendered images of a volumetric surveillance image, etc.

The invention claimed is:

1. A method for optimizing a layout of labels for annotating, with semantic information, a plurality of regions of interest in at least one rendered image of a volumetric medical imaging dataset, the method comprising:
   obtaining the at least one rendered image;
   determining locations of the plurality of regions of interest in the at least one rendered image;
   obtaining the semantic information associated with the plurality of regions of interest; and
   based on the semantic information and the locations of the plurality of regions of interest and taking into account a visibility of the labels and a further visibility of the plurality of regions of interest, determining a layout of the labels for annotating the plurality of regions of interest in the at least one rendered image, wherein the layout is a three-dimensional layout defining positions of the labels in a reference coordinate system to which the volumetric medical imaging dataset is registered;
   based on the layout of the labels and for each one of the at least one rendered image, rendering a respective overlay image depicting the labels; and
   merging each one of the at least one rendered image with the respective overlay image based on multiple depth positions determined for fragments of the respective overlay image.

2. The method according to claim 1, further comprising determining locations of a plurality of landmarks corresponding to the regions of interest in the at least one rendered image, wherein the landmarks represent locations of the corresponding region of interests, and further taking into account a visibility of the landmarks for determining the layout for the labels.

3. The method according to claim 1, wherein said determining of the layout of the labels comprises determining an initial layout and iteratively optimizing the initial layout based on a target function that is based on the visibility of the labels and the further visibility of the regions of interest, when the labels are displayed in the image.

4. The method according to claim 3, wherein the target function is further based on a proximity relationship of at least one of the labels and a corresponding landmark relative to each other.

5. The method according to claim 4, wherein the target function is further based on an occlusion rating associated with the labels, the occlusion rating being based on positions of the labels in the rendered image.

6. The method according to claim 5, wherein the occlusion rating is based on an overlap between one of the labels and another one of the labels, a region of interest, and a landmark of a region of interest.

7. The method according to claim 3, wherein the at least one rendered image comprises a movie sequence of multiple rendered images including the at least one rendered image, wherein the target function is based on a relative change of the layout between subsequent ones of rendered images of the movie sequence of multiple rendered images.

8. The method according to claim 3, wherein the target function is based on multiple criteria, wherein weighting factors associated with the multiple criteria are user-adjustable in-between subsequent iterations of said iteratively optimizing.

9. The method according to claim 1,
wherein said determining of the layout of the labels is implemented using an artificial neural network algorithm, the artificial neural network algorithm operating based on one or more inputs, the one or more inputs being based on the semantic information, the at least one rendered image, and the locations of the plurality of regions of interest.

10. The method according to claim 1, wherein the depth positions are defined based on opacity values determined for multiple positions along rays used for ray-traced rendering of the at least one rendered image based on the volumetric medical imaging dataset.

11. The method according to claim 10, wherein, based on rendering the image from the dataset:
a first depth map for the at least one rendered image is generated comprising a plurality of first depth values, wherein each first depth value of the first depth map is associated with a corresponding fragment of the at least one rendered image, wherein the first depth values correspond to a depth position, where an accumulated opacity value of a ray in volume raycasting algorithm used for rendering the at least one rendered image associated with the fragment reaches a first opacity threshold when originating from the camera view point,
wherein a depth value of a fragment in the overlay image, which corresponds to the fragment of the rendered image in an overlay, is determined based on the layout, and
wherein an opacity value of the fragment of the overlay image is adjusted based on the depth value of the fragment in the overlay image and the first depth map.

12. The method according to claim 11, wherein a second depth map for the at least one rendered image is generated, wherein each second depth value of the second depth map is associated with a corresponding fragment of the at least one rendered image, wherein the second depth values correspond to a depth position, where the accumulated opacity value of the ray in the raytracing simulation associated with the fragment in the at least one rendered image reaches a second opacity threshold, wherein the second opacity threshold is higher than the first opacity threshold, and
wherein the opacity value of the fragment in the overlay image is adjusted based on the depth of the fragment of the overlay image, the first depth map and the second depth map.

13. The method according to claim 12, wherein adjusting the opacity value of the fragment in the overlay image comprises:
determining a full opacity value for the fragment in the overlay image, when the depth value of the fragment is smaller than the first depth value of a corresponding fragment in the at least one rendered image,
determining a scaled opacity value between a full opacity value and zero opacity value based on a comparison of the depth value of the fragment in the overlay image with the corresponding first and second depth values of a corresponding fragment in the at least one rendered image, when the depth value of the fragment of the overlay image is between the first depth value and the second depth value of the corresponding fragment in the at least one rendered image; or
determining a zero opacity value for the fragment in the overlay image, when the depth value of the fragment in the overlay image is bigger than the second depth value of the corresponding fragment in the at least one rendered image.

14. The method according to claim 1, wherein the regions of interest are anatomical structures displayed in the at least one rendered image.

15. The method according to claim 1, wherein the labels comprise one or more of a 2D or 3D glyph, 2D or 3D textbox, surface, and connecting line, the connecting line being anchored at a corresponding landmark.

16. The method according to claim 1, wherein the layout of the labels comprises one or more of positions of labels in the at least one rendered image, depth positions of the labels, size of the labels, color of the labels, and text or content displayed in the labels.

17. A system comprising:
a computer comprising at least one processor and memory, the memory comprising instructions executable by the processor, wherein when executing the instructions in the processor, the computing device is configured to:
obtain a rendered image;
determine locations of regions of interest in the rendered image;
obtain semantic information associated with the regions of interest;
based on the semantic information and the locations of the regions of interest and taking into account a visibility of labels and a further visibility of the regions of interest, determine a layout of the labels for annotation of the regions of interest in the rendered image;
based on the layout of the labels, render a overlay image depicting the labels; and
merge the rendered image with a respective overlay image based on multiple depth positions determined for fragments of the overlay image.

18. The system of claim 17, wherein the layout is a three-dimensional layout defining positions of the labels in a reference coordinate system of a volumetric medical imaging dataset used to form the rendered image.

* * * * *